Oct. 30, 1945.   W. A. MAXWELL   2,387,764
COMBINATION BULLDOZER AND SHOVEL
Filed Sept. 15, 1944   2 Sheets-Sheet 1
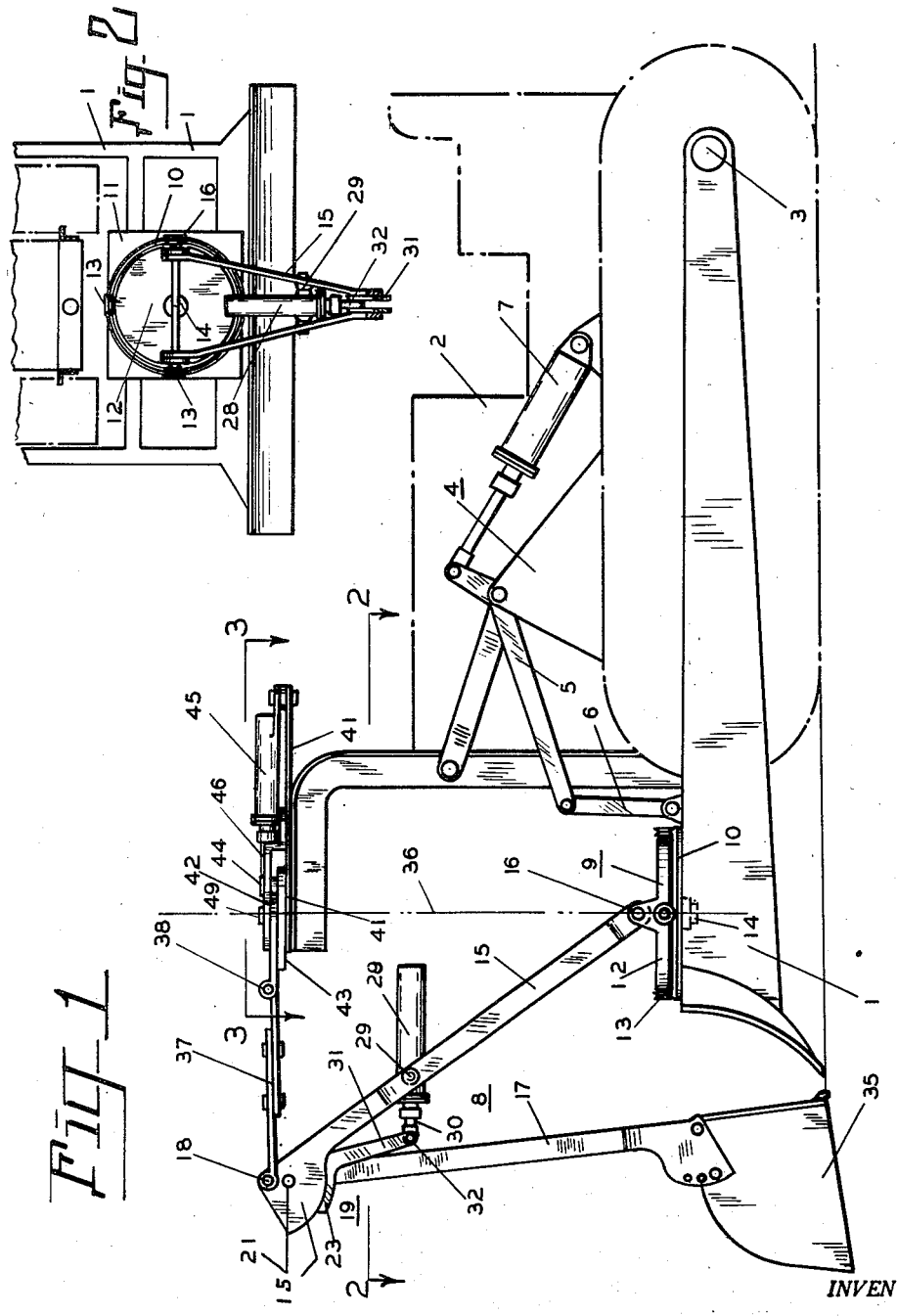
INVENTOR.
WILLARD A. MAXWELL
BY
ATTY.

Oct. 30, 1945.         W. A. MAXWELL         2,387,764
COMBINATION BULLDOZER AND SHOVEL
Filed Sept. 15, 1944         2 Sheets-Sheet 2
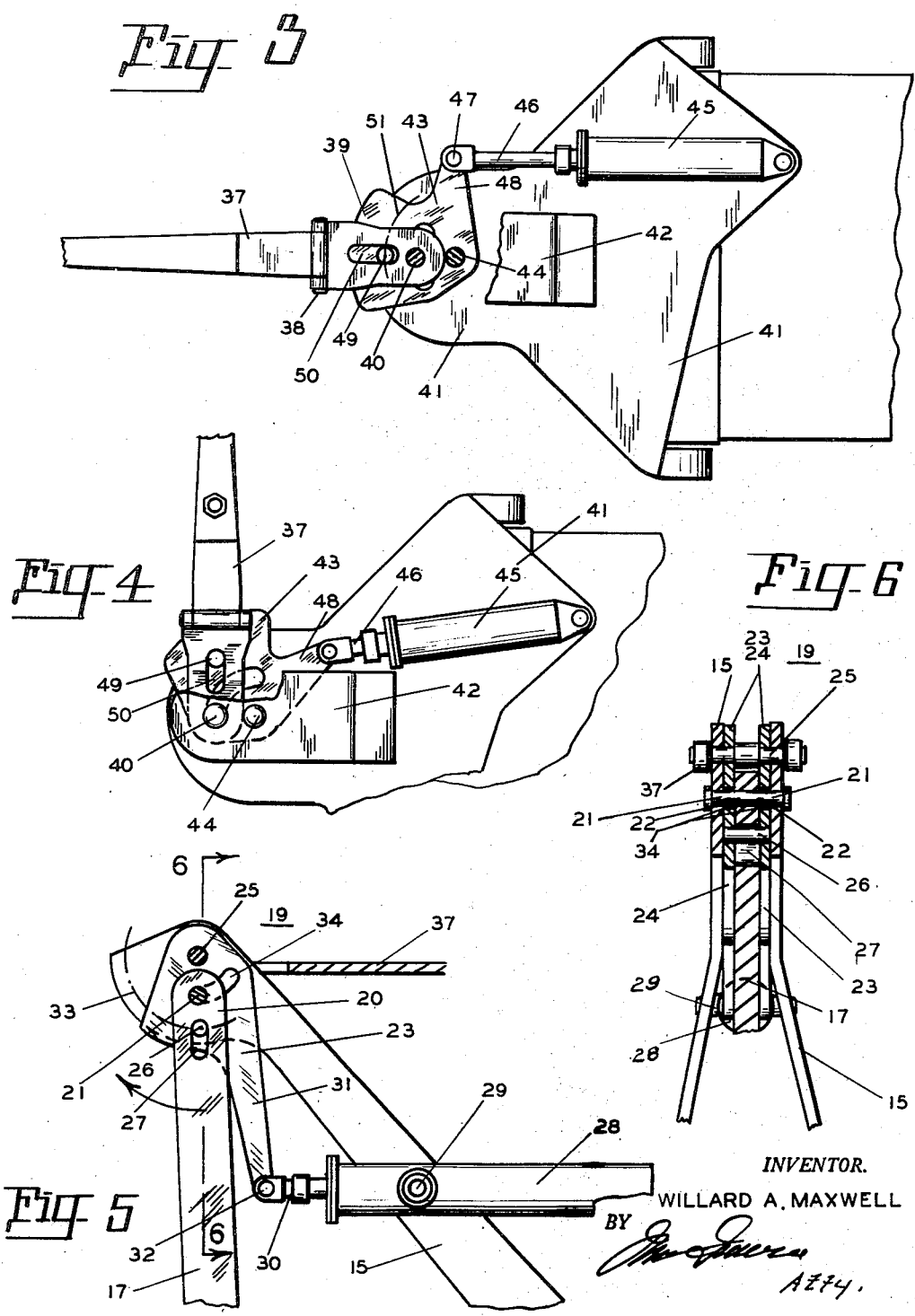
INVENTOR.
WILLARD A. MAXWELL Patented Oct. 30, 1945

2,387,764

UNITED STATES PATENT OFFICE 2,387,764

COMBINATION BULLDOZER AND SHOVEL

Willard A. Maxwell, Portland, Oreg.

Application September 15, 1944, Serial No. 554,254

11 Claims. (Cl. 214—132)

This invention relates to a combination bulldozer and shovel and the primary object of the invention is to mount a shovel assembly upon a bulldozer, combining the operation of the bulldozer with that of the shovel in one device.

Referring to the drawings:

Figure 1 is a side view of a tractor and bulldozer having my new and improved shovel combination mounted thereon.

Figure 2 is a fragmentary sectional plan view of Figure 1, taken on line 2—2 illustrating the method of mounting the shovel to the bulldozer.

Figure 3 is a fragmentary plan view of the upper part of the shovel mounting, particularly that part which revolves the shovel about its vertical axis, parts broken away for convenience of illustration.

Figure 4 is the same as Figure 3, illustrating the shovel supporting arm revolved ninety degrees about the vertical axis.

Figure 5 is a fragmentary side sectional view of the upper end of the shovel mechanism, illustrating the mechanism for raising and lowering the boom forming part of the shovel.

Figure 6 is a fragmentary sectional view of Figure 5, taken on line 6—6, looking in the direction indicated.

In the drawings:

I show a standard bulldozer 1, mounted to the tractor 2 at 3, and having the usual raising and lowering assembly 4, consisting of a bell crank 5, connecting line 6 and operating cylinder 7. My improvement consists of mounting the shovel assembly 8 upon the bulldozer 1 upon the turntable assembly 9. The turntable assembly consists of a circular track 10, fixedly mounted to the platform 11, forming part of the bulldozer 1.

A turntable 12, having trunnion wheels 13 is mounted upon the track 10 and held thereon by the king bolt 14. I have illustrated the trunnion wheels and track having a V shaped cross section, the purpose of which is to eliminate any dirt that may fall upon the track. Mounted upon the turntable 12 is an A-frame boom 15, having its lower end pivotally journaled to the turntable at 16 and having the shovel arm 17 pivotally mounted at 18 at its upper end. I have provided a quick acting operating assembly 19 for raising and lowering the shovel arm.

Referring to Figure 5, the upper end 20 of the shovel arm 17 is pivotally mounted to the cross shaft 21, which is fixedly journaled within the upper end of the frame 15 at 22. The upper end 20 of the shovel arm is mounted between levers 23 and 24, which are pivotally mounted to the cross shaft 25 at the extreme upper end of the frame 15. These two levers are connected together by a cross shaft 26, which passes through a slot 27, formed within the shovel arm 17. A hydraulic cylinder 28 is pivotally mounted at 29 to the boom 15, and has its piston rod 30 pivotally connected to the lower ends 31 of the levers 23 and 24.

In the operation of the assembly 19, the piston rod 30 moves the ends 31 of the levers 23 and 24 in the direction of the arrow. This pivots the levers about the cross shaft 25, at the same time moving the cross shaft 26 on the center line 33, which moves the shovel arm 17 therewith, pivoting the arm about its center cross shaft 21, multiplying the speed of the arm 17 relative to that of the levers 23, requiring a much less movement of the piston rod than would be required if the rod was connected to the shovel arm direct. I do not wish to be limited to move the shovel arm by this mechanism, but I have found by using the above principle of moving the shovel that better results may be obtained.

The levers 23 and 24 are permitted to go past the cross shaft 21 by the slot 34, which permits the levers to move relative to the pin 21. A shovel 35 is mounted to the lower end of the shovel arm 17 and may be of any suitable design. I provide means for revolving the shovel assembly 8 about a vertical center 36 in the following manner.

Referring to Figures 3 and 4, I illustrate a similar mechanism to that shown in Figure 5, wherein a tie rod 37 is pivotally mounted to the upper end of the frame 15 at 18, and is also hingedly mounted at 38 to a plate 39, which is mounted to the center pin 40, fixedly secured at its lower end to the frame 41 and to the bracket 42 at its upper end. The lever arm assembly 43 is pivotally mounted to the center pin 44. This pin is fixedly mounted to the frame 41 at its lower end and to the bracket arm 42 at its upper end. In the operation of this unit a hydraulic cylinder 45, having its piston rod 46 pivotally mounted at 47 to the lever arm 48, referring to Figure 4, the piston rod 46 has been moved to the position shown, having pulled the lever arm 48 and the lever arm assembly 43 with it, revolving the tie rod 37 about its center pin 40 in the following manner.

A pin 49 is fixedly secured to the lever assembly 43 and operates in a slot 50 within the plate 39 and as the pin followed on the circle 51 it moved the tie rod 37 to the position shown in Figure 4. Due to the relative position of the pivot point 40 of the tie rod assembly 37 and the pivot point 44 of the lever assembly 43, together with the position of the pin 49, the movement of the tie rod 37 was approximately ninety degrees, while the movement of the lever arm 48 was approximately forty-five degrees, thereby requiring a much lesser movement of the piston rod than it would be required if it were connected directly to the tie rod assembly. Again I do not wish to be limited to this mechanism for moving the tie rod and the shovel assembly 8 about its vertical axis, but merely illustrate this principle which I have developed for greater efficiency of the shovel.

In the operation of my new and improved shovel, the shovel can be operated in any direction relative to the bulldozer and tractor within a radius of one hundred and eighty degrees. The shovel is raised and lowered vertically by the operating mechanism for lowering and raising the bulldozer. The tie rod 37 being pivotally mounted at 38 and 18 permits this vertical movement.

I do not wish to be limited to this exact structure, as other equivalents may be substituted still coming within the scope of my claims.

I claim:

1. A combined bulldozer and shovel, including a bulldozer, a turntable mounted on and carried solely by the bulldozer, a boom swingingly mounted on the turntable, a shovel arm pivotally supported by the boom, a shovel carried by said arm, and means for swinging the shovel arm relative to the boom, said means including a motor means carried by the boom and lever means supported on the boom and operated by the motor means to move the shovel arm and shovel carried thereby in both directions on its pivotal mounting in a plane including the boom and shovel arm.

2. A construction as defined in claim 1, wherein the lever means is mounted on a pivot carried by the boom offset from the pivot of the shovel arm relative to the boom.

3. A construction as defined in claim 1, wherein the lever means has a limited driven connection with the shovel arm and a limited free swinging movement with respect to the boom.

4. In a combined bulldozer and shovel, a bulldozer, a turntable mounted on and carried solely by the bulldozer, a boom swingingly supported on the turntable, a shovel arm pivotally connected to the end of the boom, a shovel carried by the arm, a hydraulic motor carried by the boom, lever means connecting the motor and shovel arm and operative to swing the shovel arm in the longitudinal plane including the boom, a second hydraulic motor and means intermediate said motor and the free end of the boom for operating the shovel arm and shovel carried thereby in an arcuate plane with respect to the plane of the boom.

5. A construction as defined in claim 4 wherein the second hydraulic motor and lever means intermediate said motor and boom operates the turntable relative to the bulldozer to swing the boom, shovel arm and shovel according to the movements of the turntable.

6. A combined bulldozer and shovel including a bulldozer, a shovel assembly including a boom, pivotally mounted shovel arm and shovel mounted for bodily turning movement directly on and with respect to the bulldozer, and independent mechanisms for controlling the shovel assembly, one of said mechanisms being supported on the boom and moving the shovel arm in a longitudinal plane including the boom and the other of said mechanisms being mounted on a rigid support and operating the shovel mechanism in an arcuate plane with respect to the plane of the bulldozer.

7. A combined bulldozer and shovel including a portable support, a bulldozer pivotally mounted on said support, a hydraulic motor for adjusting the bulldozer, a frame rising from the bulldozer, a turntable supported on and solely by the bulldozer, a shovel assembly carried by the turntable, means for operating the shovel assembly in a longitudinal plane including the bulldozer and means mounted on the support for moving the shovel assembly in an arcuate plane with respect to the bulldozer.

8. A construction as defined in claim 7 wherein the shovel assembly includes a boom swingingly connected to the turntable, a shovel arm pivotally connected to the end of the boom remote from the turntable and a shovel carried by the shovel arm and wherein the means for operating the shovel assembly in a longitudinal plane including the bulldozer includes a hydraulic motor pivotally supported on the boom, a lever arm connected to the motor and having a pivot mounted on the boom offset from the pivot mounting between the boom and the shovel arm and a connection between the lever and shovel arm offset from the pivot between the boom and the shovel arm.

9. A construction as defined in claim 7 wherein the shovel assembly includes a boom swingingly connected to the turntable, a shovel arm pivotally connected to the end of the boom remote from the turntable and a shovel carried by the shovel arm and wherein the means for operating the shovel assembly in a longitudinal plane including the bulldozer includes a hydraulic motor pivotally supported on the boom, a lever arm connected to the motor and having a pivot mounted on the boom offset from the pivot mounting between the boom and the shovel arm and a connection between the lever and shovel arm offset from the pivot between the boom and the shovel arm, the lever having a limited swinging connection with the boom and a limited swinging connection with the shovel arm.

10. A construction as defined in claim 7 wherein the shovel assembly includes a boom swingingly connected on the turntable, a shovel arm pivotally supported on the boom and a shovel carried by the arm, and wherein the mechanism for moving the shovel assembly in an arcuate plane to the plane including the bulldozer includes a hydraulic motor mounted on the support, a lever operated by said motor and pivotally mounted on said support, means for permitting relatively free swinging movement of the lever relative to its pivot, an arm connected to the boom and having a limited free pivotal mounting on the lever, and a pin extending from the lever, said arm being slotted to receive the pin.

11. A combination bulldozer and shovel, consisting of a turntable mounted upon the upper surface of the bulldozer, having a boom pivotally mounted thereon, a shovel arm pivotally mounted on the upper end of the boom, an operating lever mounted within the apex of the boom and the shovel arm, a hydraulic cylinder pivotally mounted to the boom and operating the said lever which in turn pivots the shovel arm relative to the boom, a tie rod for supporting the upper end of the boom to the frame of the machine, said tie rod being pivotally mounted to the said frame and rotatable about a vertical axis relative to the turntable, a rotating means consisting of an operating arm connected to the tie rod and operated by a suitable power device.

WILLARD A. MAXWELL.